(12) United States Patent
Azulay et al.

(10) Patent No.: US 7,846,985 B1
(45) Date of Patent: Dec. 7, 2010

(54) METHOD AND SYSTEM FOR PROCESSING WASTE MATERIALS

(75) Inventors: Amit Azulay, Beer Sheva (IL); Yuval Tamir, Moshav Avihail (IL)

(73) Assignee: Yuval Tamir, Moshav Avihail (IL)

( * ) Notice: Subject to any disclaimer, the term of this patent is extended or adjusted under 35 U.S.C. 154(b) by 0 days.

(21) Appl. No.: 11/576,213

(22) PCT Filed: Sep. 28, 2005

(86) PCT No.: PCT/IL2005/001043

§ 371 (c)(1),
(2), (4) Date: Sep. 25, 2007

(87) PCT Pub. No.: WO2006/035441

PCT Pub. Date: Apr. 6, 2006

Related U.S. Application Data

(60) Provisional application No. 60/613,238, filed on Sep. 28, 2004.

(51) Int. Cl.
C08J 11/04 (2006.01)

(52) U.S. Cl. .................. 521/40; 521/40.5; 521/41; 521/45.5; 528/480; 528/481; 528/491; 528/502 R; 528/502 C; 264/37.1; 264/37.29

(58) Field of Classification Search .............. 521/40, 521/40.5, 41, 41.5, 48; 264/115, 141, 40.1, 264/37, 209.3, 176.1, 177.2, 211, 211.12, 264/211.21; 525/184, 179, 58, 60; 524/169, 524/271, 274, 13; 528/480, 481, 491, 502 R, 528/502 C, 503

See application file for complete search history.

(56) References Cited

U.S. PATENT DOCUMENTS

| 3,850,771 | A | | 11/1974 | Penque |
| 4,013,616 | A | | 3/1977 | Wallace |
| 4,626,189 | A | | 12/1986 | Hammer et al. |
| 4,772,430 | A | | 9/1988 | Sauda et al. |
| 4,968,463 | A | * | 11/1990 | Levasseur .................. 264/40.1 |
| 5,217,655 | A | * | 6/1993 | Schmidt ..................... 264/471 |

(Continued)

FOREIGN PATENT DOCUMENTS

EP 0943728 A1 9/1999

(Continued)

Primary Examiner—Ling-Siu Choi
Assistant Examiner—Frances Tischler
(74) Attorney, Agent, or Firm—Greenberg Traurig, LLP

(57) ABSTRACT

Methods and systems for processing waste materials and for manufacturing composite materials are disclosed herein. According to some embodiments, the heterogeneous waste includes a plastic component and a non-plastic component, and the non-plastic component includes a plurality of pieces of waste. The heterogeneous waste is heated to melt at least a portion of said plastic component and reducing a volume of said heterogeneous waste, and then mixed (e.g. by rotating a mixing chamber or by stirring) until at least some said pieces are each encapsulated by the melted plastic component. Upon cooling, the mixture optionally sets into a composite material. The presently disclosed invention does not require pre-sorting of the heterogeneous waste and is operative to process "as is" waste. Optionally, the waste is pre-sorted. Exemplary uses for the composite material include but are not limited to flooring sheets, construction bricks, thermal insulation, acoustic walls, road paving materials, road beds, ballistic shields shock absorbing flooring, artificial islands, artificial reefs, and marine docks.

13 Claims, 3 Drawing Sheets

U.S. PATENT DOCUMENTS

| | | |
|---|---|---|
| 5,534,207 A | 7/1996 | Burrus |
| 5,589,260 A * | 12/1996 | Ben Zvi et al. .............. 428/327 |
| 5,837,171 A | 11/1998 | Danzik et al. |
| 6,017,475 A | 1/2000 | Cantrell |
| 6,204,312 B1 | 3/2001 | Taylor |
| 6,253,527 B1 | 7/2001 | De Zen |
| 6,423,254 B1 | 7/2002 | Bertoglio |
| 7,101,164 B2 | 9/2006 | Bouldin |
| 7,303,160 B2 | 12/2007 | Bouldin et al. |
| 7,311,504 B2 | 12/2007 | Bouldin et al. |
| 2004/0080072 A1 | 4/2004 | Bouldin et al. |
| 2005/0077167 A1 | 4/2005 | Gonzalez Salazar et al. |

FOREIGN PATENT DOCUMENTS

| | | |
|---|---|---|
| EP | 1354681 A1 | 10/2003 |
| EP | 1863620 A2 | 4/2006 |
| GB | 2393682 A | 8/2003 |
| KR | 2003-0014929 | 2/2003 |
| WO | 95/34418 | 12/1995 |
| WO | 2005/092708 | 10/2005 |
| WO | 2006/035441 A2 | 4/2006 |
| WO | 2006/079842 A1 | 8/2006 |

* cited by examiner

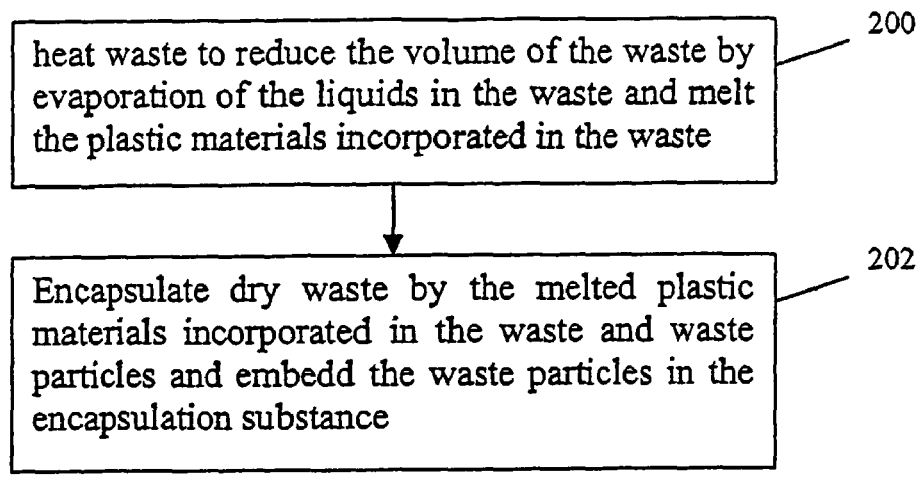
FIG. 2   mixing
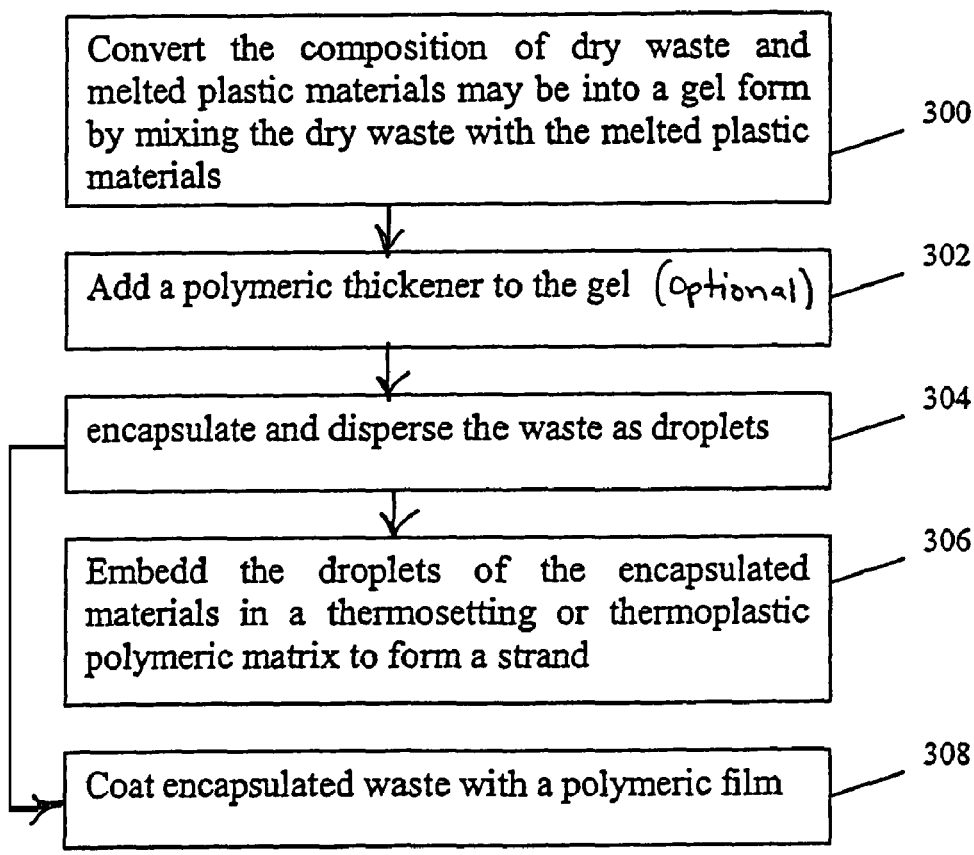
FIG. 3

METHOD AND SYSTEM FOR PROCESSING WASTE MATERIALS

FIELD AND BACKGROUND OF THE INVENTION

The present invention relates to disposal systems and methods for recycling of waste by processing waste materials, and specifically reuse of waste materials into usable composite materials using incorporated plastic materials and aggregates from waste.

Recycling is the collection and reuse of materials that would otherwise be considered waste to produce new products. Motivation for recycling includes environmental concerns, as recycling reduces the use of energy and raw materials and further reduces the need to dispose of waste. in situations where production from recycled material is less expensive than from new material. While an extensive variety of waste is recyclable, materials commonly recycled on an industrial scale include glass, paper, aluminum, and steel. Recycled materials can be derived from pre-consumer waste (materials used in manufacturing), or post-consumer waste (materials discarded by the consumer).

One form of recycling is the reuse of goods, especially bottles. Reuse is distinguished from most forms of recycling, where the good is reduced to a raw material and used in the making of a new good (e.g. crushing of bottles to make glass for new bottles).

The disposal of waste demands resources of many kinds. Typically, these resources include sorting raw waste products, transporting the waste, and incinerating the waste. Often waste producers cannot afford to process the waste they produce and the environment suffers from waste buildup, ending up in the bed of a river as toxic river sludge.

There is thus a need for, and it would be highly advantageous to have disposal systems and methods for recycling of waste by processing waste materials, and specifically reuse of waste materials into usable composite materials using incorporated plastic materials and aggregates from waste.

Certain methods of stabilization and/or recycling and/or reuse of wastes are known in the art. A representative reference including potentially relevant background material is U.S. Pat. No. 6,204,312 which discloses a process for manufacturing organic and inorganic compositions, using non toxic resin formulations. U.S. Pat. No. 6,204,312 utilizes waste material as aggregate in a composite material and the matrix material of the composite material is formed by resin from non-waste sources. The present invention stabilizes, recycles and re-uses solid waste material as aggregate and matrix of a composite material.

The term "waste" as used herein includes materials unwanted and/or rejected as worthless whether domestic, medical, commercial or industrial and further includes unwanted materials already in the environment.

The term "waste material," as used herein, may relate to one or more byproducts resulting from at least one process and having relatively little or no substantial use or worth. The waste material may be a substance generated, for example, during an industrial process. In some examples, waste material may be a substance that is generally disposed, destroyed (e.g., incinerated), and/or recycled in a process associated with one entity (e.g., a waste material generator or other entity possessing the waste material) paying a fee to another entity handling the disposal, destruction, and/or recycling of the substance. The waste material may include hazardous and/or non-hazard waste material and may include liquids, solids, and semi-solid materials (e.g., sludge).

The product of the process of embodiments of the present invention is a "composite material". Although "composite materials" are generally fully engineered materials, with typically well defined components including matrix materials and aggregates, the term "composite material" as used hereinafter is defined more broadly to include as components matrix materials and aggregates which are minimally controlled because the components are sourced from waste materials. Further "aggregates" or "pieces" as defined herein include a large variety of solid waste pieces from small sub millimeter size particles, to large manufactured waste products of centimeters and meters in size such as electrical appliances, metal furniture, and even automobiles. Aggregates are typically of solid materials including metals, ceramics, and glass materials. Matrix materials are derived from plastic materials, especially common thermoplastic materials such as polyethylene and polypropylene.

Reference: http://en.wikipedia.org/wiki/Waste_Recycling

SUMMARY OF THE INVENTION

The aforementioned needs are satisfied by several aspects of the present invention.

It is now disclosed for the first time a method of waste treatment, the method comprising:
  a) receiving a heterogeneous waste, said heterogeneous waste including a plastic component and a non-plastic component, said non-plastic component including plurality of pieces of waste;
  b) heating said heterogeneous waste thereby melting at least a portion of said plastic component and reducing a volume of said heterogeneous waste; and
  c) mixing said heterogeneous waste until at least some said pieces are each encapsulated by said melted plastic component such that upon cooling, said mixture sets into a composite material.

According to some embodiments, at least about 5% by weight of the heterogeneous waste is the plastic component. Thus, in one example, a majority of the heterogeneous waste is river sludge containing 5% to 10% by weight of a plastic component.

Alternatively or additionally, at least 10% or at least 12% by weight of the heterogeneous waste is the plastic component. Thus, in another example, a majority of the heterogeneous waste is domestic waste or domestic refuse containing about 12% to about 22% by weight of the plastic component. In some embodiments, the heterogeneous waste contains at most about 50% by weight, or at most about 60% by weight of the plastic component.

According to some embodiments, said mixing includes effecting at least one process selected from the group consisting of rotating said waste mixture within a chamber, stirring said mixture and agitating said mixture.

According to some embodiments, said heterogeneous waste includes a non-zero moisture content, and said heating at least partially dries said heterogeneous waste to reduce said non-zero moisture content.

According to some embodiments, the method further comprises
  d) forming said composite material by effecting at least one process selected from the group consisting of shaping and molding.

According to some embodiments, the method further comprises
  d) forming said composite material into a sheet.

Thus in one non-limiting example, the "sheet" is useful for flooring material or as a ballistic shield.

According to some embodiments, the method further comprises d) smoothing and/or painting a surface of said composite material.

Thus, in one example, it is necessary to smooth and/or paint the composite material for use in housing and/or building construction as a brick or as flooring.

According to some embodiments, the method further comprises d) compressing said heterogeneous waste to form said composite material.

There is no explicit minimum pressure necessary, and the skilled artisan will apply the appropriate pressure in accordance with the intended use of the composite material. In some embodiments, the heterogeneous waste is subjected to at least 2 atmospheres, at least 5 atmospheres, at least 10 atmospheres, at least 20 atmospheres or at least 50 atmospheres of pressure.

According to some embodiments, a plastic content of said heterogeneous waste is identified, and said heterogeneous waste is subjected to a pressure determined at least in part by said identified plastic content of said heterogeneous waste.

According to some embodiments, the step of pressuring includes determining a target pressure, and a greater said plastic content provides a lesser said target pressure.

According to some embodiments, after formation of the composite material, at least one physical property selected from the group consisting of an elasticity (e.g. to determine suitable for use as a ballistic shield, a road barrier, a shock absorbing material, a piece of furniture and any other item requiring material elasticity), a heat conduction (e.g. to determine suitability for use as an insulating wall), a coefficient of friction (e.g. to determine suitability for use as road pavement), a compression strength (e.g. to determine suitability for use as a construction material), and chemical stability or leaching (e.g. to determine environmental properties) is measured.

According to some embodiments, said non-plastic component includes particulate matter.

According to some embodiments, said heterogeneous waste includes at least one of household refuse, industrial waste, medical waste, rubber marine sludge, and hazardous material.

There is no additional limitation on the type of waste, and no limitation and the source of waste. Appropriate types of waste include but are not limited to household refuse, industrial waste, medical waste, rubber marine sludge, and hazardous material. Furthermore, as used herein, it is understood that "heterogeneous waste" refers to any waste material with more than one component, and does not imply that the waste is required to be a mixture of more than one type of waste or a mixture of waste from more than one source.

According to some embodiments, at least about 5% by weight, or at least about 10% by weight of said heterogeneous waste is said rubber. It is noted that use of heterogeneous waste including rubber can imbue the composite material with a desired degree of elasticity. In one example, the waste includes between about 5% and about 80% by weight rubber.

According to some embodiments, a majority of said pieces of waste are encapsulated by said melted plastic component.

According to some embodiments, substantially all said pieces of waste (e.g. at least 80% of the pieces or at least 90% of the pieces) are encapsulated by said melted plastic component.

Although in some embodiments, the method is appropriate for unsorted or "as is" waste, in some embodiments, at least some said pieces of waste are optionally selectively removed before said heating.

According to some embodiments, said heterogeneous waste is heated in a mixing chamber, and said heating includes introducing a heated gas into said mixing chamber and heating an external surface of said mixing chamber. Thus, in one non-limiting example, the mixing chamber is a "large" mixing chamber (e.g. characteristic dimension on the other of magnitude of at about least 3-5 meters), and a heated gas (e.g. air or another appropriate gas) is introduced into the mixing chamber. In another non-limiting example, the mixing chamber is a "small" mixing chamber (e.g. characteristic dimension on the other of magnitude of at about one meter) suitable for a building or in a hospital (e.g. no need to transport waste off site) and the external surface of the mixing chamber is heated.

According to some embodiments, a toxic material is mixed with heterogeneous waste before said heating.

According to some embodiments, said heterogeneous material is heated to at least about 80 degrees Celsius. According to some embodiments, said heterogeneous material is heated to at least most about 180 degrees Celsius.

In some embodiments, the heterogeneous waste is heating below an evaporation point of the plastic components. It is appreciated that the specific evaporation point of the plastic components can vary depending on the type and quality of the plastic.

In some embodiments, the heterogeneous waste is heating below a carbonization point of the plastic components. It is appreciated that the specific carbonization point of the plastic components can vary depending on the type and quality of the plastic.

This is in contrast with combustion processes carried out at, for example, between 600 and 750 degrees Celsius, or carbonization processes.

There is no specific limitation on the characteristic dimension of the pieces of waste of the non-plastic component, and the skilled artisan can select the appropriate use for the composite material and the appropriate operating parameters in accordance at least in part with the characteristic dimension of the pieces of waste. Thus, in one example, the characteristic length of the pieces of waste on the order of magnitude of about 5 millimeters. In a separate non-limiting example, the pieces of waste may include pieces of waste whose characteristic length is on the order of magnitude of about 10 centimeters, or even on the order of magnitude of over one meter.

According to some embodiments, the heterogeneous waste is substantially unsorted waste, e.g. waste (e.g. domestic refuse or other waste) provided "as is" that is not subjected to an often expensive sorting process.

Thus, according to some embodiments, said heterogeneous waste includes at least one of organic material, metals, glasses and paper products.

According to some embodiments, said heterogeneous waste is subjected to at least one of drying, crushing, sorting grinding and shredding before said heating According to some embodiments, the method is carried out as a process selected from the group consisting of a continuous process and a batch process in a chamber.

According to some embodiments, the composite material is continuously expelled from said chamber.

According to some embodiments, the method further comprises:

d) adding an agent selected from the group consisting of at least one of a thickener and a binding agent to said heterogeneous waste, and said mixing includes mixing said agent with said heterogeneous waste.

According to some embodiments, a viscosity of at least a portion of said heterogeneous waste is determined, and at least one parameter selected from the group consisting of an amount of said agent to add and a type of said agent to add is determined in accordance with said determined viscosity.

According to some embodiments, said determining of said viscosity includes:

i) obtaining a sample of said heterogeneous waste; and
ii) determining a viscosity of said sample.

It is now disclosed for the first time a composite material prepared by any method of the aforementioned methods or by any method disclosed herein.

According to some embodiments, said composite material is substantially stable against leaching.

According to some embodiments, the composite material is "substantially solid." It will be appreciated, the "substantially solid" is often defined as being able to substantially maintain its form while being subjected to at least 1 MPa of pressure, though in some embodiments, the material is imbued with a higher degree of solidity (e.g. able to withstand at least 5 MPa, 10 MPa, 15 MPa or 21 MPa of pressure).

According to some embodiments, any item selected from the group consisting of a flooring sheet, a road paving material, a road bed, a shock absorbing flooring, an acoustic wall, a thermal insulation material, a ballistic shield, a marine dock, an artificial reef, an artificial island and a marine wave breaker prepared by using any aforementioned method or any method disclosed herein.

It is now disclosed for the first time a method of toxic waste treatment comprising:

a) providing a heterogeneous waste, said heterogeneous waste including a toxic component, a plastic component and a non-plastic component, said non-plastic component including plurality of pieces of waste;

b) heating said waste mixture thereby melting at least a portion of said plastic component and reducing a volume of said heterogeneous waste;

c) at least partially encapsulating said toxic component by mixing said heterogeneous waste until at least some said pieces are each encapsulated by said melted plastic component.

According to some embodiments, at least about 5% by weight of the heterogeneous waste is the plastic component.

According to some embodiments, said toxic component includes at least one of an organic toxin, an inorganic toxin, a heavy metal and a radioactive material.

According to some embodiments, said step of providing said heterogeneous waste includes mixing said toxic component with a substantially non-toxic waste mixture.

According to some embodiments, substantially all of said toxic component (e.g. at least 90%, at least 95% or at least 99%) is encapsulated.

There is no specific limitation on the specific weight of the composite material that may be generated or manufactured by the aforementioned method. In some embodiments, the specific weight is at least 1, at least 1.5 or at least 2, or at least 2.2. The specific weight of the composite material manufactured depends on the application for he material, and the skilled artisan can select appropriate parameters (e.g. compressing to a greater pressure yields a greater specific weight).

In some embodiments, the volume reduction of the processed heterogeneous waste (e.g. the heated and mixed heterogeneous waste) is at most about 80%. In some embodiments, the weight reduction of the processed heterogeneous waste (e.g. the heated and mixed heterogeneous waste) is at most about 40%.

In some embodiments, the processed heterogeneous waste substantially undergoes no chemical transformation (e.g. breaking or forming of covalent bounds).

It is now disclosed for the first time a method of toxic waste treatment a system for generating a composite material from waste, the system comprising:

a) a feeder for receiving a heterogeneous waste, said heterogeneous waste including a plastic component and a non-plastic component, said non-plastic component including plurality of pieces of waste;

b) a chamber for processing said heterogeneous waste;

c) a heating apparatus for melting at least a portion of said plastic component in said chamber and for reducing a volume of said heterogeneous waste; and d) a mixing mechanism for mixing said heterogeneous waste in said chamber until at least some said pieces are each encapsulated by said melted plastic component such that upon cooling, said mixture sets into a composite material.

According to some embodiments, the system includes a control (e.g. a computer control) operative to effect any method disclosed herein.

According to some embodiments, the further comprises e) a mechanical processing device for subjecting said heterogeneous waste to at least one process selected from the group consisting of drying, crushing, grinding and shredding; and f) a mechanism for bringing said mechanically processed waste to said feeder.

According to some embodiments the system further comprises g) a pressure cell for pressurizing said heterogeneous waste after said heating and said mixing, said pressure cell disposed to receive said processed waste from said chamber.

According to some embodiments, the system of claim further comprises f) an elasticity measuring device for measuring an elasticity of said processed heterogeneous waste.

These and further embodiments will be apparent from the detailed description and examples that follow.

BRIEF DESCRIPTION OF THE DRAWINGS

The invention is herein described, by way of example only, with reference to the accompanying drawings, wherein:

FIG. 2 is a schematic flow-chart illustrating an additional method for treatment of waste according to some exemplary embodiments of the present invention;

FIG. 3 is a schematic illustration of a method for encapsulation of waste according to some exemplary embodiments of the present invention;

DESCRIPTION OF THE PREFERRED EMBODIMENTS

Figure 1:
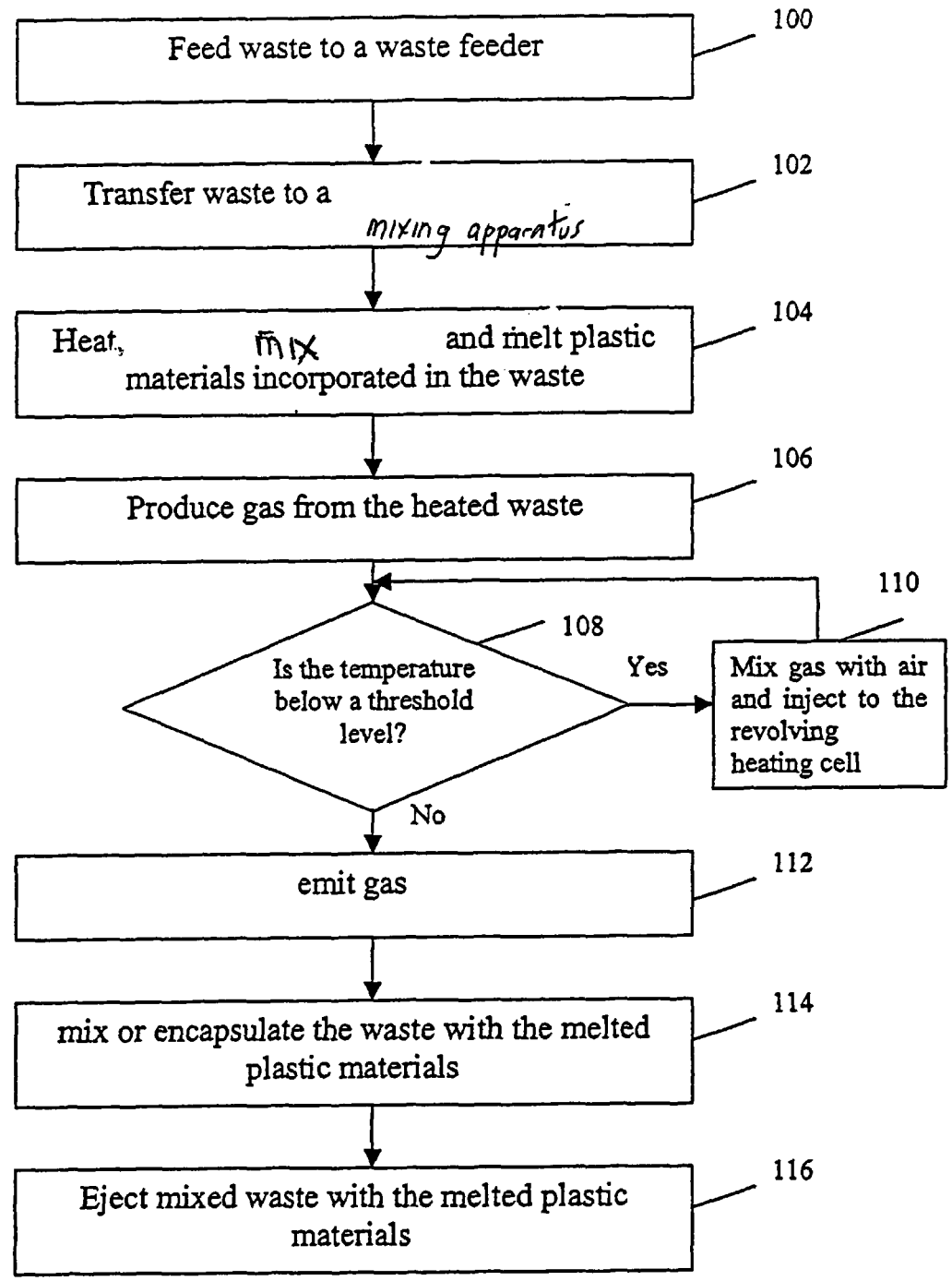
FIG. 1 is a schematic flow-chart illustrating a method for treatment of waste according to some exemplary embodiments of the present invention.

The present invention is of a system and method for reuse of waste materials into usable composite materials using incorporated plastic materials and aggregates from waste.

The principles and operation of stabilizing, recycling and reusing waste materials into usable materials using incorporated plastic materials and aggregates from waste, according to the present invention, may be better understood with reference to the drawings and the accompanying description.

It should be noted, that although the discussion herein relates primarily to reuse of waste materials into usable composite materials using incorporated plastic materials and aggregates from waste, the present invention may, by non-limiting example, alternatively be configured as well for disposal of waste such as toxic waste without necessarily reusing the final product made using certain processes, according to the present invention. Alternatively, embodiments of the present invention are useful for reducing volume and/or weight of waste without stabilizing or recycling.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, a principal intention of embodiments of the present invention is a reduction or a drastic reduction of volume and weight of raw waste materials. Typically, reduction of volume and weight is achieved by heating, mixing and optionally compression of the waste materials causing in different components of the raw waste materials, melting of thermoplastic materials, shrinking of thermoplastic materials, evaporation of liquids and volatile materials. A second intention of embodiments of the present invention includes forming a new composition of matter which is stable solid and consequently useful for various industrial purposes such as construction. According to some embodiments of the present invention the composition of matter of the present invention may be molded or otherwise formed into useful materials such as bricks or tiles. Another intention of embodiments of the present invention is to use essentially 100% waste materials with minimal requirement for pre-processing such as sorting. Another intention of embodiments of the present invention is to clear landfills or river beds of unwanted waste products already polluting the environment. In some embodiments, the waste used may be unstable or toxic before processing according to the present different embodiments of the invention. Another intention of certain embodiments of the present invention is to encapsulate aggregates of solid waste material with melted waste thermoplastic and/or partially waste decomposed thermoset plastic materials. In different embodiments of the present invention, the typical aggregate size may large, several meters in size, such as a junked automobile or the typical aggregate size may be small less than a millimeter such as when waste material is shredded or ground prior to processing according to an embodiment of the present invention. When the aggregate size is large, the large aggregates are encapsulated in material originating from plastic refuse and the resulting composite may be used for instance for a breakwater. In certain embodiments of the present invention, for when components of the waste materials are unstable, a primary intention is to stabilize the unstable components by encapsulating them with a stable material originating from waste polymeric materials.

Figure 4:
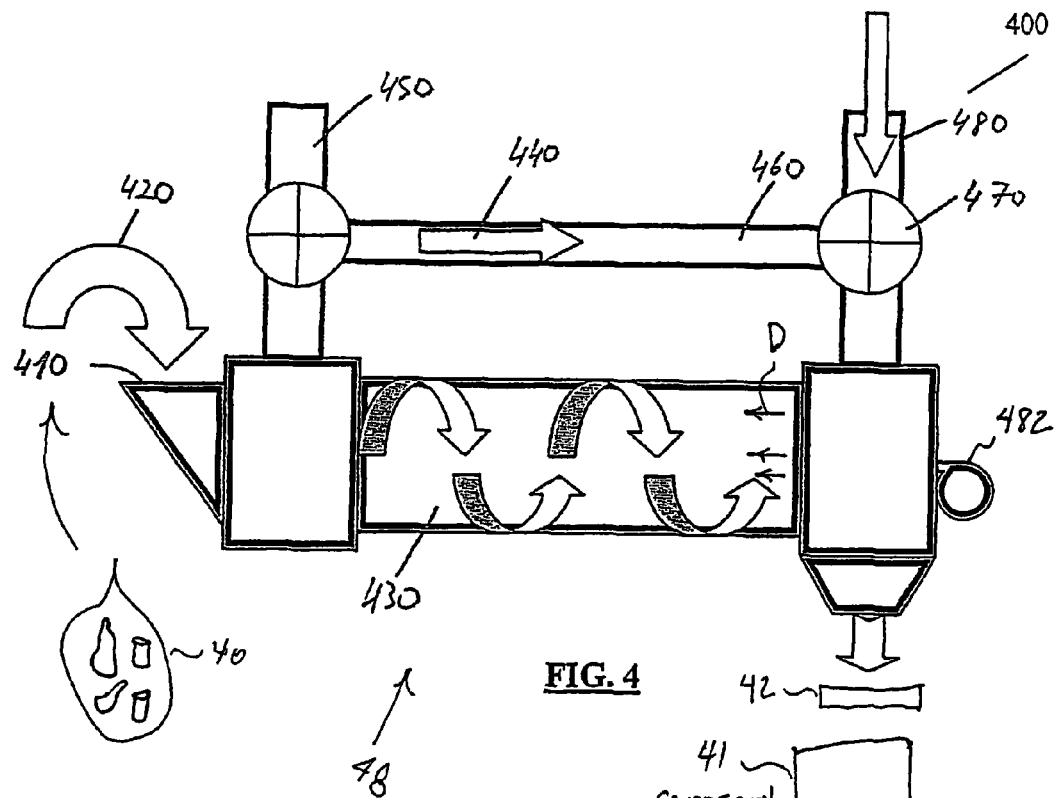
FIG. 4 is a schematic illustration of a cross sectional view of a system for treatment of waste according to some exemplary embodiments of the present invention.

Reference is now made to FIG. 1 which is a schematic flow diagram illustrating a method 10 for treatment of raw heterogeneous waste according to some exemplary embodiments of the present invention. Reference is also now made to FIG. 4 a diagram of a system 48, according to embodiments of the present invention. Initially, in step 100 waste material 40, e.g. household waste including a plastic component, e.g. plastic bottles and a non-plastic component, e.g. aluminum cans, is fed into a waste feeder 410. The waste is transferred (step 102) into a mixing chamber 430. The interior of mixing chamber 430 is preferably heated to a temperature in the vicinity of 90 to 150 degrees Celsius using a heating apparatus 482. Preferably, an inlet gas, e.g. air, enters through gas inlet 480 is heated by heating apparatus 482 and flows in a direction D preferably opposite to the flow of the waste material through chamber 430. Plastic materials, typically thermoplastic waste materials incorporated within raw waste 40 are melted or otherwise are gelled or are partially liquefied step (104). During heating (step 104), any solvents present in the raw waste material, e.g. water, residual monomers or other volatile materials, e.g. plasticizers produce gas (step 106) which exits from chamber 430 through gas outlet 450 along with the outlet gas.

Alternatively, the waste may be partially heated by a controlled or partial oxidation or combustion of the combustible waste components. The gas flow is preferably used as a control mechanism for temperature in chamber 430. If the temperature of chamber 430 is below a threshold level (optional step 108), the outlet gas may be mixed with air as inlet gas and injected back (optional step 110) to chamber 430 through pipe 440 to increase the internal temperature. Otherwise, the outlet gas may be fully emitted (step 112) and pure air is injected into the revolving cell. As the waste is mixed (step 104) pieces of the aggregate are encapsulated (step 114) by the melted, liquified and/or gelled plastic materials in chamber 430. The waste mixed with the melted plastic material is ejected (step 116) and sets into a composite material 42, according to an embodiment of the present invention. In accordance the volume of produced composite 42 has a significantly reduced volume compared with the volume of raw heterogeneous waste 40. Furthermore, composite material 42 is stable and inert, and safe for human contact.

Reference is now made to FIG. 2 which is a schematic flow diagram illustrating an additional method for stabilization of toxic waste according to exemplary embodiments of the resent invention. The method may include heating the waste in order to reduce the volume of the waste by evaporation volatiles in the waste and melting the plastic materials incorporated in the waste (step 200). The waste may be heated by a controlled or partial combustion of the waste. Alternatively or in addition to the combustion of the waste, the cell may be heated by oil, gas, or electricity. Afterwards, pieces of toxic waste are encapsulated by melted plastic materials incorporated in the waste and the waste particles are embedded (step 202) in the encapsulation substance or matrix. The described method ensures that a direct contact with the waste and/or leak of hazardous solid materials will be avoided.

In accordance with some embodiments of process 10 may be performed as a continuous process, according to system 40 or as a non-continuous or batch process.

It should be noted that in accordance with some embodiments of the present invention, operating conditions of the heating and rotating cell might be controlled to optimize process 10 20 for a particular heterogeneous mixture of raw waste 40. For example, operation parameters such as the mass flow rate of the waste, the rotating speed of the cell and the temperature within the cell may be controlled and adjusted.

Reference is now made to FIG. 3 which is a schematic flow-chart illustrating a method for waste treatment according to some exemplary embodiments of the present invention. During step 104, plastic material may be in a gel or liquid form of relatively low viscosity. In this case, an operator may test or otherwise observe (optional step 300) viscosity and add a thickener to increase the viscosity of the gel. Alternatively, the pieces of waste material are ejected (step 116) and dispersed as droplets (optional 304) coated with plastic material 510. The droplets are optionally further encapsulated in a polymeric matrix (optional step 306) such as by adding additional polymeric and extruding into a strand. Alternative the coated droplets may be formed into a composite film (optional block 308).

Reference is now again made to system 48 of FIG. 4. According to some embodiments of the present invention, composite material 42 is further compressed in a compression cell 41 to form a composite material 50 of higher density than that of composite material 42.

Figure 5:
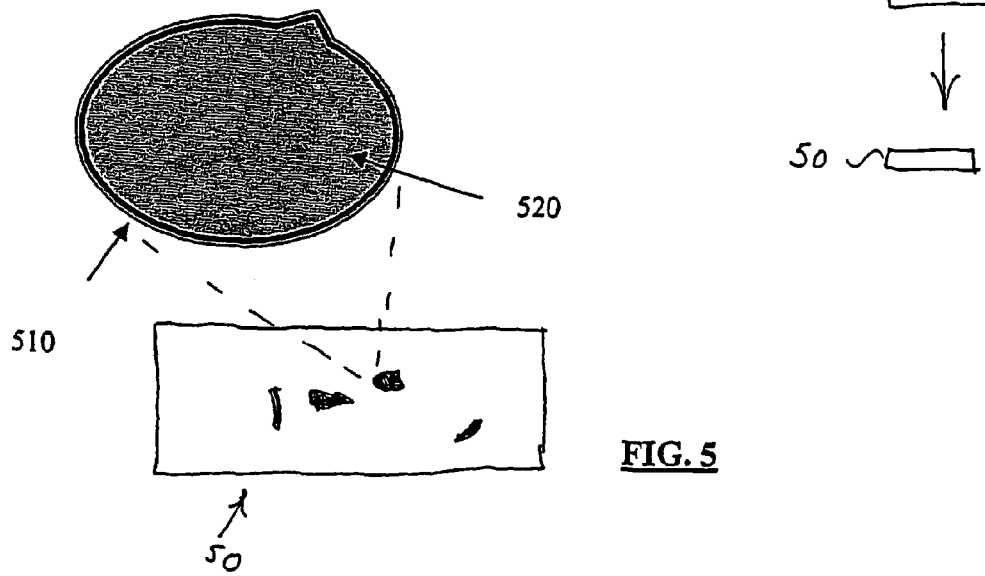
FIG. 5 is a schematic illustration of a cross sectional view of a composite material produced according to some exemplary embodiments of the present invention.

Reference is now made to FIG. 5, which is a schematic illustration of a cross section view of an pieces of aggregate 520 coated and encapsulated in matrix material 510.

System 48 was constructed and process 10 was tested using two types of raw heterogeneous waste mixtures 40. Sample 1 was a waste mixture from typical household waste, i.e. and sample two was a sample of toxic sludge from the bed of Kishon River in Israel. In both cases, LPG (cooking gas) was used as an inlet gas. Burning the LPG gas produced heat. Conversion ratio is 20 kg LPG per 1 metric waste mixture 40; temperature was maintained at 110-160 degrees Celsius during mixing and heating (step 104). Mixing and (step 104) was performed during a few minutes. Raw material 40 (household) density was 150 kg/cubic meter. Upon compressing using compression cell 41 (at a pressure of about 100 atmospheres), density of composite material 50 increased to 1500 kg/cubic meter for sample 1. For sample 2, the raw mixture 40 of density 1500 kg/cubic meter and after compression composite material 50 had density 2000 kg/meter. Composite materials 50 were tested as construction materials using standard cylindrical samples diameter 40 mm and length 80 mm under leaching and compression in that order according to the standard test procedure. Both composite materials 50 were tested for environmental leaching according to European Standard EN12457-2, (include Standard methods EU standard (homogenized) test 2540, 5310B and 4500H+). Both samples passed the leaching test. Leach test results are attached to this document. Composite materials 50 produced from sample 1 (40 household) were found to withstand 16 MegaPascal of pressure without breakage. Composite materials 50 of sample 2 (40 sludge) were found to withstand 23 MegaPascal of pressure without breakage.

It will be appreciated that for the simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In accordance with some embodiments of the present invention, an unlimited quantity of waste may be processed to a stable, non-toxic material which may be further utilized, for example, to form bricks in various sized, materials for building roads, etc. the described method, system and apparatus may be cheap convenient and non polluting.

While certain features of the invention have been illustrated and described herein, many modifications, substitutions, changes and equivalents may occur to those skilled in the art. It is, therefore, to be understood that the appended claims are intended to cover all such modifications and changes as fall within the true spirit of the invention.

Results are attached as Appendix 1 and Appendix 2.

Appendix 1

| Sample ID: 060124102 | Sample description: Domestic waste | Sampling date: Jun. 20,2005 |
|---|---|---|
| Temp.: Room temperature | Storage conditions: Not refrigerated | Phase state: Solid |

| Test description | Units | Result | Apparatus | Method |
|---|---|---|---|---|
| T D.S solvates | mg S/L | 40 | | Standard Method 2540 |
| T.O.C total carbon | mgC/Kg | 119 | | Standard Method 5310B |
| pH | | 7.02 | | Standard Method 4500H+ |
| Br— | mg/Kg | <10 | | |
| Cl— | mg/L | 153 | | |
| F— | mg/Kg | <1 | | |
| $NO_3$ | mg/Kg | <10 | | |
| $PO_4$ | mg/Kg | <10 | | |
| $SO_4$ | mg/Kg | 28 | | |
| Al | mg/Kg | <0.5 | ICP | EN 12457-2 |
| As | mg/Kg | <0.5 | ICP | EN 12457-2 |
| Ba | mg/Kg | <0.5 | ICP | EN 12457-2 |
| Ca | mg/Kg | 90.1 | ICP | EN 12457-2 |
| Cd | mg/Kg | <0.5 | ICP | EN 12457-2 |
| Co | mg/Kg | <0.5 | ICP | EN 12457-2 |
| Cr total | mg/Kg | <0.5 | ICP | EN 12457-2 |
| Cu | mg/Kg | <0.5 | ICP | EN 12457-2 |
| Fe | mg/Kg | 1.2 | ICP | EN 12457-2 |
| Hg | mg/Kg | <0.5 | ICP | EN 12457-2 |
| K | mg/Kg | 43.1 | ICP | EN 12457-2 |
| Li | mg/Kg | 1.4 | ICP | EN 12457-2 |
| Mg | mg/Kg | 8.6 | ICP | EN 12457-2 |
| Mn | mg/Kg | <0.5 | ICP | EN 12457-2 |
| Mo | mg/Kg | <0.5 | ICP | EN 12457-2 |
| Na | mg/Kg | 55 | ICP | EN 12457-2 |
| Ni | mg/Kg | <0.5 | ICP | EN 12457-2 |
| P | mg/Kg | <0.5 | ICP | EN 12457-2 |
| Pb | mg/Kg | <0.5 | ICP | EN 12457-2 |
| S | mg/Kg | 14 | ICP | EN 12457-2 |
| Sb | mg/Kg | <0.5 | ICP | EN 12457-2 |
| Se | mg/Kg | <0.5 | ICP | EN 12457-2 |
| Si | mg/Kg | 2.2 | ICP | EN 12457-2 |
| Sn | mg/Kg | <0.5 | ICP | EN 12457-2 |
| Sr | mg/Kg | <0.5 | ICP | EN 12457-2 |
| Tl | mg/Kg | <0.5 | ICP | EN 12457-2 |
| V | mg/Kg | <0.5 | ICP | EN 12457-2 |
| Zn | mg/Kg | 1.0 | ICP | EN 12457-2 |

Appendix 2

| Sample ID: 050124101 | Sample description: | Kishon Creek sludge | Sampling date: | Jun. 20, 2005 |
|---|---|---|---|---|
| Temp.: Room temperature | Storage conditions: | Not refrigerated | Phase state: | Solid |

| Test description | Units | Result | Apparatus | Method |
|---|---|---|---|---|
| T D.S solvates | mg/L | 16 | | Standard Method 2540 |
| T.O.C total carbon | mgC/Kg | 37 | | Standard Method 5310B |
| pH | | 7.84 | | Standard Method 4500H+ |
| Br— | mg/Kg | 10 | | |
| Cl— | mg/Kg | 71 | | |

Appendix 2-continued

| | | | | |
|---|---|---|---|---|
| F— | mg/Kg | <10 | | |
| NO3 | mg/Kg | <10 | | |
| PO4 | mg/Kg | <10 | | |
| SO4 | mg/Kg | 47 | | |
| Al | mg/Kg | <0.5 | ICP | EN 12457-2 |
| As | mg/Kg | <0.5 | ICP | EN 12457-2 |
| Ba | mg/Kg | <0.5 | ICP | EN 12457-2 |
| Ca | mg/Kg | 974 | ICP | EN 12457-2 |
| Cd | mg/Kg | <0.5 | ICP | EN 12457-2 |
| Co | mg/Kg | <0.5 | ICP | EN 12457-2 |
| Cr total | mg/Kg | <0.5 | ICP | EN 12457-2 |
| Cu | mg/Kg | <0.5 | ICP | EN 12457-2 |
| Fe | mg/Kg | <0.5 | ICP | EN 12457-2 |
| Hg | mg/Kg | <0.5 | ICP | EN 12457-2 |
| K | mg/Kg | 2.4 | ICP | EN 12457-2 |
| Li | mg/Kg | 1.3 | ICP | EN 12457-2 |
| Mg | mg/Kg | 6.5 | ICP | EN 12457-2 |
| Mn | mg/Kg | <0.5 | ICP | EN 12457-2 |
| Mo | mg/Kg | <0.5 | ICP | EN 12457-2 |
| Na | mg/Kg | 11.1 | ICP | EN 12457-2 |
| Ni | mg/Kg | <0.5 | ICP | EN 12457-2 |
| P | mg/Kg | <0.5 | ICP | EN 12457-2 |
| Pb | mg/Kg | <0.5 | ICP | EN 12457-2 |
| S | mg/Kg | 18.9 | ICP | EN 12457-2 |
| Sb | mg/Kg | <0.5 | ICP | EN 12457-2 |
| Se | mg/Kg | <0.5 | ICP | EN 12457-2 |
| Si | mg/Kg | 3.4 | ICP | EN 12457-2 |
| Sn | mg/Kg | <0.5 | ICP | EN 12457-2 |
| Sr | mg/Kg | <0.5 | ICP | EN 12457-2 |
| Tl | mg/Kg | <0.5 | ICP | EN 12457-2 |
| V | mg/Kg | <0.5 | ICP | EN 12457-2 |
| Zn | mg/Kg | <0.5 | ICP | EN 12457-2 |

What is claimed is:

1. A method for waste treatment comprising:
   a. providing a heterogeneous unsorted waste comprising:
      i) a plastic component comprising at least one thermoplastic component, wherein an amount of the plastic component in the heterogeneous unsorted waste varies between about 5% to 50% by weight of the heterogeneous unsorted waste;
      ii) at least one non-plastic component, wherein the at least one non-plastic component comprises at least one organic material;
   b. mixing while heating the of heterogeneous unsorted waste in a manner so as to allow at least a portion of the thermoplastic component to melt;
   c. forming a composite material, comprising the result of step (b); and
   d. processing the composite material, wherein the step of the processing the composite material comprises cooling the composite material.

2. The method of claim 1, additionally comprising one or more of drying, shredding, grinding and crushing the heterogeneous unsorted waste prior to heating while mixing.

3. The method of claim 1, comprising subjecting the heterogeneous unsorted waste to at least 5 atmospheres of pressure.

4. The method of claim 3, comprising subjecting the heterogeneous unsorted waste to at least 20 atmospheres of pressure.

5. The method of claim 1, comprising adding at least one thickener, at least one binding agent or a mixture of same.

6. The method of claim 1, wherein the heterogeneous unsorted waste is mixed with or comprises toxic waste.

7. The method of claim 1, wherein the heterogeneous unsorted waste is heated prior to mixing while heating so as to reduce moisture content.

8. The method of claim 6, wherein the toxic waste comprises one or more of organic toxins, inorganic toxins, heavy metals and radioactive materials.

9. The method of claim 1, wherein said processing of the composite material comprises at least one of shaping, compressing or molding prior to cooling.

10. The method of claim 1, wherein the heterogeneous unsorted waste comprises particulate matter.

11. The method of claim 1, wherein the heterogeneous unsorted waste is selected from the group comprising household refuse, medical waste, industrial waste, rubber marine sludge, and hazardous material.

12. The method of claim 1, comprising a continuous process or a batch process, when the method is a continuous process, the heterogeneous unsorted waste is mixed while being heated in a chamber and the composite material is continuously expelled from the chamber.

13. The method of claim 1, wherein the heterogeneous unsorted waste comprises at least one of metals, glasses and paper products.

* * * * *